US007742663B2

(12) United States Patent
Buckley et al.

(10) Patent No.: US 7,742,663 B2
(45) Date of Patent: Jun. 22, 2010

(54) WAVE ENERGY TRANSMISSION APPARATUS FOR HIGH-TEMPERATURE ENVIRONMENTS

(75) Inventors: John D. Buckley, Newport News, VA (US); William C. Edwards, Poquoson, VA (US); Warren C. Kelliher, Hampton, VA (US); Ingrid A. Carlberg, Yortown, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/261,376

(22) Filed: Oct. 30, 2008

(65) Prior Publication Data

US 2009/0110351 A1 Apr. 30, 2009

Related U.S. Application Data

(60) Provisional application No. 60/983,747, filed on Oct. 30, 2007.

(51) Int. Cl.
*G02B 6/00* (2006.01)
*G01K 11/00* (2006.01)
(52) U.S. Cl. ........................................ 385/12; 374/159
(58) Field of Classification Search .................. 385/12; 347/159
See application file for complete search history.

(56) References Cited

U.S. PATENT DOCUMENTS

| 3,231,416 | A | | 1/1966 | Fuller |
|---|---|---|---|---|
| 3,299,275 | A | | 1/1967 | Green et al. |
| 3,357,237 | A | | 12/1967 | Le Bel |
| 3,395,035 | A | | 7/1968 | Strauss |
| 3,525,597 | A | * | 8/1970 | Mazdiyasni et al. ........ 264/1.22 |
| 3,626,758 | A | | 12/1971 | Stewart et al. |
| 3,855,849 | A | | 12/1974 | Lordan |
| 4,081,291 | A | * | 3/1978 | English et al. .............. 136/232 |
| 4,669,818 | A | | 6/1987 | Myer |
| 5,075,267 | A | | 12/1991 | Fujii et al. |
| 5,078,507 | A | * | 1/1992 | Koller ........................ 374/159 |
| 5,180,228 | A | | 1/1993 | Tarumi et al. |
| 5,209,569 | A | * | 5/1993 | Fujiwara et al. ............... 374/55 |
| 5,308,809 | A | * | 5/1994 | Baumard et al. ........... 264/1.22 |
| 5,474,618 | A | | 12/1995 | Allaire |

(Continued)

FOREIGN PATENT DOCUMENTS

EP 0651271 A2 5/1995

(Continued)

OTHER PUBLICATIONS

Roger A. Craig, William C. Davy and Ellis E. Whiting, "Science Objectives and Performance of a Radiometer and Window Design for Atmospheric Entry Experiments", NASA Technical Memorandum 4637, Aug. 1994, pp. 1-19, Moffett Field, CA.

(Continued)

*Primary Examiner*—Charlie Peng
(74) *Attorney, Agent, or Firm*—Helen M. Galus

(57) ABSTRACT

A wave energy transmission apparatus has a conduit made from a refractory oxide. A transparent, refractory ceramic window is coupled to the conduit. Wave energy passing through the window enters the conduit.

15 Claims, 5 Drawing Sheets

U.S. PATENT DOCUMENTS

| | | | |
|---|---|---|---|
| 5,495,546 | A | 2/1996 | Bottoms, Jr. et al. |
| 5,585,547 | A | 12/1996 | Kim et al. |
| 5,608,515 | A | 3/1997 | Shu et al. |
| 5,732,166 | A * | 3/1998 | Hamann et al. ............... 385/12 |
| 5,786,287 | A * | 7/1998 | Bayya et al. .................. 501/10 |
| 6,104,853 | A | 8/2000 | Miyagi et al. |
| 6,696,685 | B2 | 2/2004 | Schumacher |
| 6,895,314 | B2 | 5/2005 | Ailor et al. |
| 2004/0124312 | A1 | 7/2004 | Mueller et al. |

FOREIGN PATENT DOCUMENTS

| | | |
|---|---|---|
| JP | 6008898 | 1/1994 |
| JP | 2007063069 | 3/2007 |

OTHER PUBLICATIONS

John D. Buckley, Ingrid A. Carlberg, Warren C. Kelliher, William C. Edwards and Timothy D Schott, "Innovative Structural Design and Materials for Transmission to and Protection of UV and IR Sensors during Atmospheric Re-Entry or in other High-Temperature Environments(>3500°F)", NASA ITAR Notice, pp. 1-27, Hampton, VA.

H. E. Pattee, R.M. Evans, and R.E. Monroe, "Joining Ceramics and Graphite to other Materials", NASA SP-5052 Report, 1968, pp. 1-91, NASA Technical Utilization Division, Washington, D.C.

* cited by examiner

WAVE ENERGY TRANSMISSION APPARATUS FOR HIGH-TEMPERATURE ENVIRONMENTS

ORIGIN OF THE INVENTION

The invention was made by employees of the United States Government and may be manufactured and used by or for the Government of the United States of America for governmental purposes without the payment of any royalties thereon or therefor. Pursuant to 35 U.S.C. §119, the benefit of priority from provisional application 60/983,747, with a filing date of Oct. 30, 2007, is claimed for this non-provisional application.

BACKGROUND OF THE INVENTION

1. Field of the Invention

This invention relates to wave energy transmission apparatus. More specifically, the invention is a wave energy transmission apparatus designed to transmit optical wave energy from a high-temperature environment to a thermally-protected environment.

2. Description of the Related Art

Space vehicles encounter extreme elevated temperatures (>3000° F.) and dynamic pressures that have in some cases produced powdery char from thermally-induced, ablation-heat-shield charring during atmospheric re-entry. The resulting char can fly into radiometer measurement ports such as those installed for determining exterior re-entry heating conditions on Apollos IV and VI. The heat shield char filling the optical ports obstructs the spectral and thermal readings of the spectrometer or radiometer. Similar problems exist in wind tunnels, scramjet combustors, or laboratory applications when, for example, radiometer measurement ports are formed in a heat-shielding structure used to separate a high-temperature environment from a thermally-protected environment.

Additionally, transparent windows designed for high temperature environments typically have a crystalline structure. When exposed to re-entry or other high-temperature environments, differences in thermal expansion can develop along grain boundaries in crystalline windows and lead to window failure.

SUMMARY OF THE INVENTION

Accordingly, it is an object of the present invention to provide an apparatus that can be used to transmit wave energy from a high-temperature environment to a thermally-protected environment.

Other objects and advantages of the present invention will become more obvious hereinafter in the specification and drawings.

In accordance with the present invention, a wave energy transmission apparatus has a conduit defined by solid walls made from a refractory oxide. The conduit has a first open end and a second open end. A transparent, amorphous ceramic window is coupled to a portion of the solid walls at the first open end of the conduit. Wave energy impinging on the window is passed therethrough to the conduit's first open end.

DETAILED DESCRIPTION OF THE INVENTION

Figure 1:
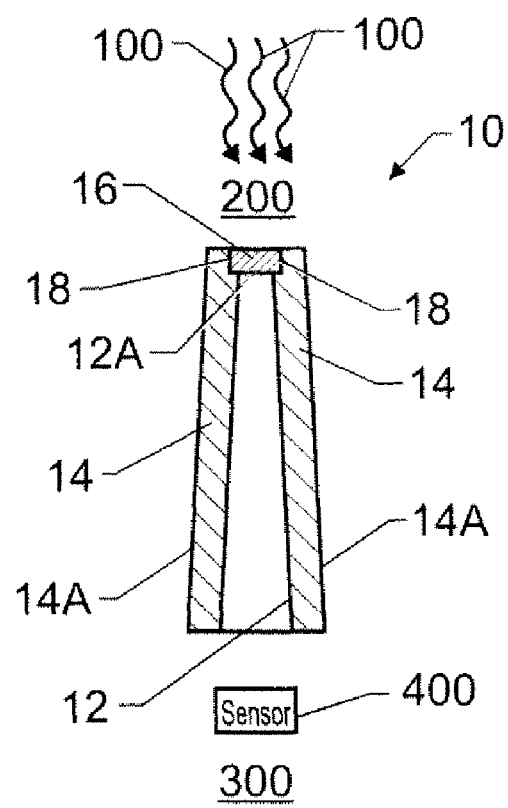
FIG. 1 is a cross-sectional view of a wave transmission apparatus in accordance with an embodiment of the present invention.

Referring now to the drawings and more particularly to FIG. 1, a wave energy transmission apparatus in accordance with an embodiment of the present invention is shown in cross-section and is referenced generally by numeral 10. As used herein, the phrase "wave energy" generally refers to optical wave energy from the ultraviolet, visible and/or infrared spectrums. As is known in the art of space vehicle re-entry, wave energy in these spectrums can be used to identify the physical and chemical properties of the ionized plasma behind a space vehicle's re-entry shock wave. Thus, in terms of space vehicle re-entry, this wave energy originates in a high-temperature environment.

Wave energy transmission apparatus 10 is constructed to transmit wave energy 100 originating in a high-temperature environment 200 to a lower-temperature environment 300. Typically, some type of wave energy sensor 400 is located in lower-temperature environment 300. The term "sensor" as used herein refers to any type of optical sensor (e.g., photodiode), sensing system (e.g., spectrometer, radiometer, etc.), or any other device/system that will use wave energy 100. Further, sensor 400 could be positioned in line with apparatus 10 as shown, but could also be located within the interior of the apparatus, or located remotely with respect to apparatus 10 without departing from the scope of the present invention. If sensor 400 is located remotely with respect to apparatus 10, optical fibers (not shown) would typically be used to collect wave energy 100 from within apparatus 10 and then transmit same to a remotely-located sensor 400.

For reasons that will be explained further below, apparatus 10, as shown, includes a conduit 12 whose side walls define a conically-shaped section formed by solid walls 14 made from a high-temperature refractory oxide. The exterior surface 14A of solid walls 14 can be conical (as shown) or other simple or complex geometric shapes without departing from the scope of the present invention. The tapered end 12A of conduit 12 has a transparent window 16 fitted therein. Window 16 can be made from a refractory ceramic, for example, amorphous ceramic.

When high-temperature environment 200 is a re-entry shockwave generated in an oxygen environment, walls 14 can be made, for example, from zirconia, hafnia, yttria, or mixtures thereof, while window 16 can be made, for example, from yttria, neodymium-doped yttria, yttria-stabilized zirconia, or zirconia, Additionally, for non-oxygen environments, window 16 could also be made from boron carbide, silicon carbide or diamond. Mixtures or combinations of these window materials could also be potentially used.

Window 16 can be fitted in conduit 12 in a variety of ways without departing from the scope of the present invention. If an adhesive is used to fix window 16 in conduit 12, the adhesive must be able to withstand the temperatures of high-temperature environment 200. Window 16 could also be press-fit or insertion bonded to conduit 12 as would be understood in the art. For example, walls 14 could be formed to define a recess 18 that supports window 16 axially while an interference fit is formed between the radial walls of window 16 and the radial walls of recess 18. Such insertion bonding techniques are disclosed by, for example, H. E. Pattee et al., "Joining Ceramics and Graphite to Other Materials," NASA SP5052, 1968, which is hereby incorporated by reference as if set forth in its entirety.

Figure 2:
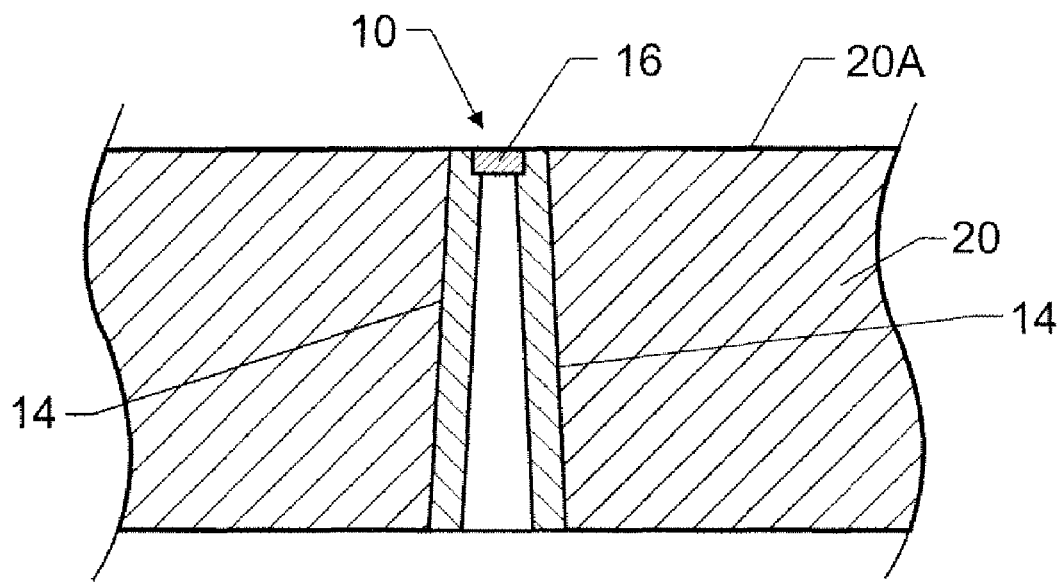
FIG. 2 is a cross-sectional view of the wave energy transmission apparatus installed in a wall structure in accordance with an embodiment of the present invention.

Referring now to FIG. 2, wave energy transmission apparatus 10 is installed in a wall structure 20 designed to thermally protect environment 300 from the high temperatures in environment 200. In this embodiment, tapered end 12A with window 16 fitted therein is flush with the surface 20A of wall structure 20. Conduit 12 extends fully through wall structure 20. The conical shape of conduit 12 minimizes the footprint of apparatus 10 at surface 20A, while increasing the surface area for coupling thereof to structure 20. Coupling and/or bonding of walls 14 to wall structure 20 can be achieved in a variety of ways without departing from the scope of the present invention.

Figure 3:
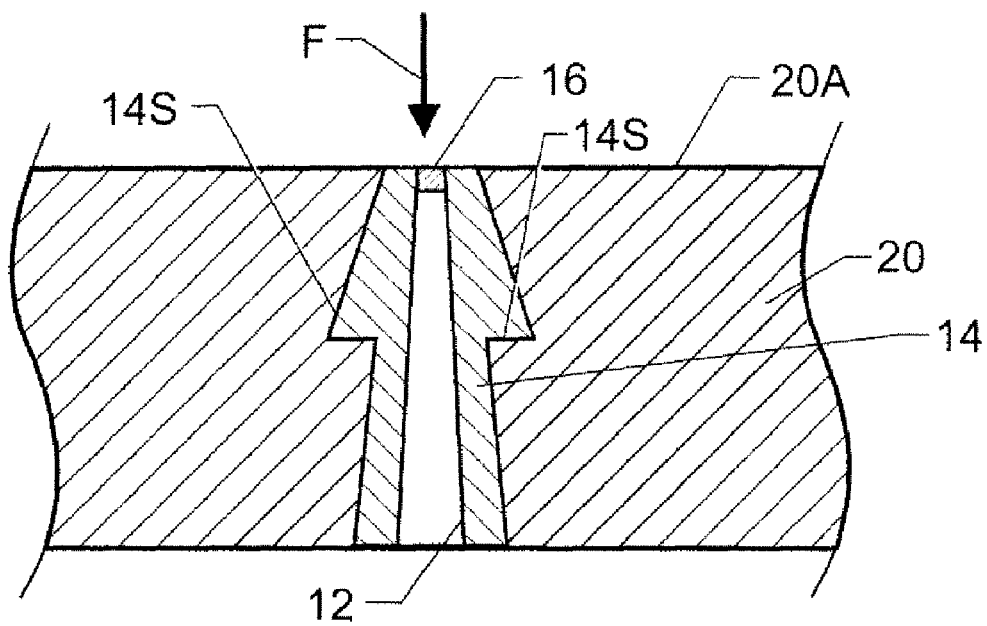
FIG. 3 is a cross-sectional view of another embodiment of a wave energy transmission apparatus installed in a wall structure.

As mentioned above, the exterior surface of walls 14 can define a geometric shape other than the conical shape shown in FIGS. 1 and 2. For example, FIG. 3 illustrates an exterior wall shape that incorporates a step 14S in the exterior surface of walls 14, Step 14S facilitates the retention of apparatus 10 in wall structure 20 where a pressure force F is applied axially to apparatus 10 as is the case when, for example, wall structure 20 defines a re-entry structure for a space vehicle.

Figure 4:
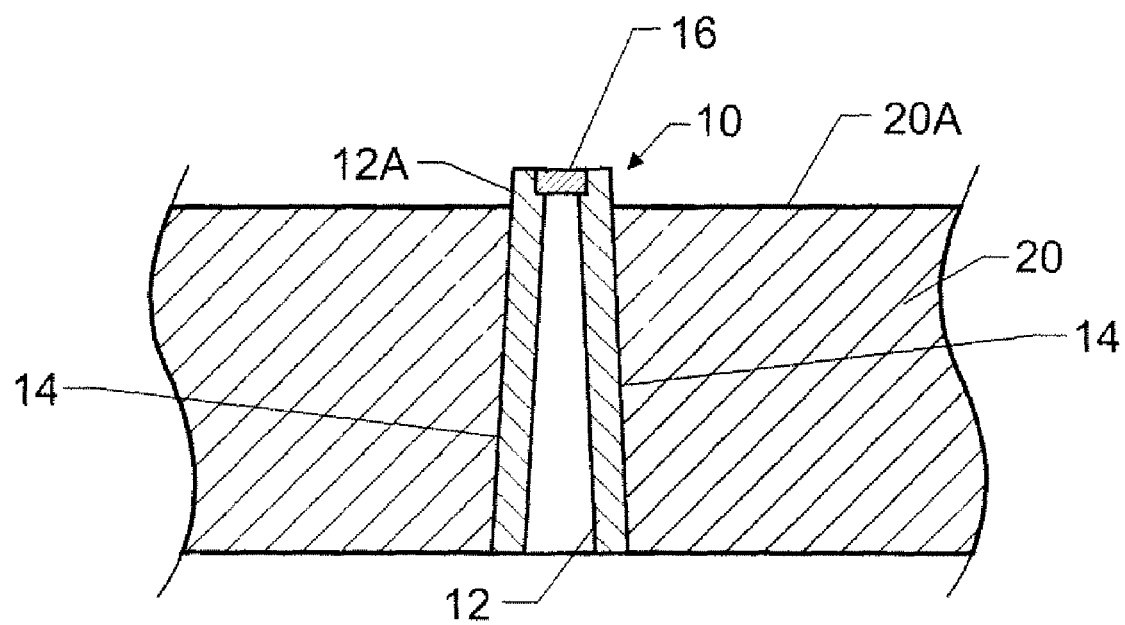
FIG. 4 is a cross-sectional view of a wave energy transmission apparatus installed in a thermal protection system that includes an ablative heat shield.

When the present invention is to be included in a space vehicle's re-entry structure, wall structure 20 will define a thermal protection system with surface 20A being typically formed by an ablative heat shield material. In this case, wave energy transmission apparatus 10 can be positioned such that tapered end 12A with window 16 fitted therein protrudes from surface 20A as shown in FIG. 4. In this way, ablative char generated upon re-entry will not collect on window 16.

Figure 5:
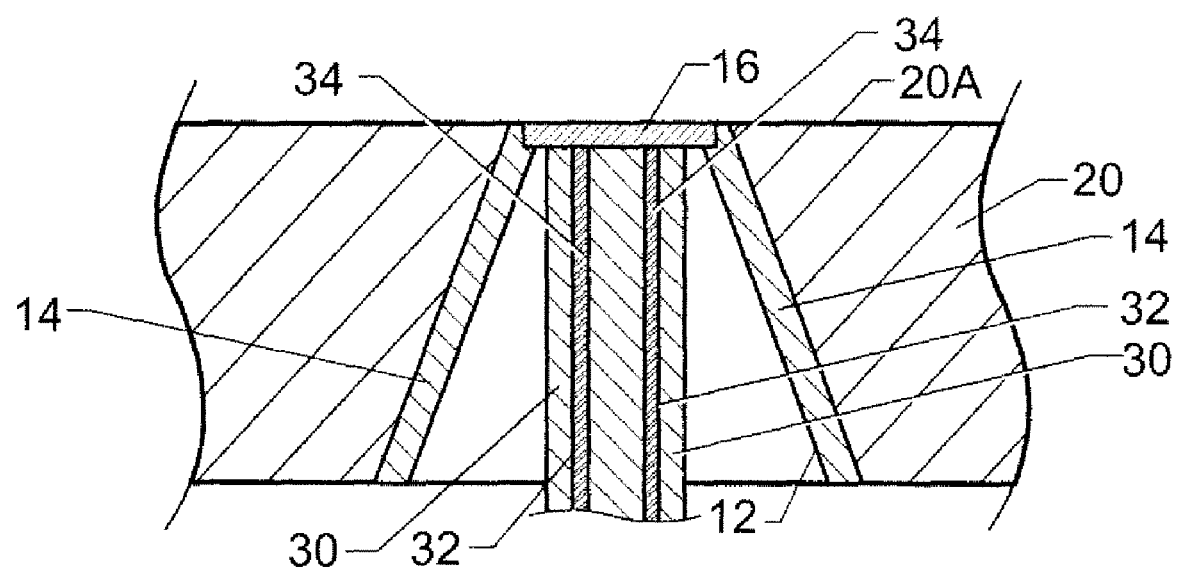
FIG. 5 is a cross-sectional view of a wave transmission apparatus installed in a wall structure in accordance with another embodiment of the present invention.

The various conically-shaped conduits described thus far can be used to transmit wave energy through the air space contained by the conduit. Another option is to position one or more optical fibers in the conduit to transmit the wave energy transmitted through window 16, for example, to a remote location. For extremely high temperature applications (e.g., space vehicle re-entry applications), another option is illustrated in FIG. 5 where one or more optical fibers are encased in a protective tube that is positioned in conduit 12. Specifically, a refractory oxide, solid-wall elongated housing 30 (e.g., an elongated cylinder made from zirconia) defines one or more axially-oriented through holes 32 (e.g., two are shown in the illustrated example). Each hole 32 encases one or more optical fiber(s) 34. In this way, housing 30 thermally protects the encased optical fibers 34. One end of housing 30 is positioned adjacent to window 16 so that optical energy passing therethrough is coupled into fibers 34.

Figure 6:
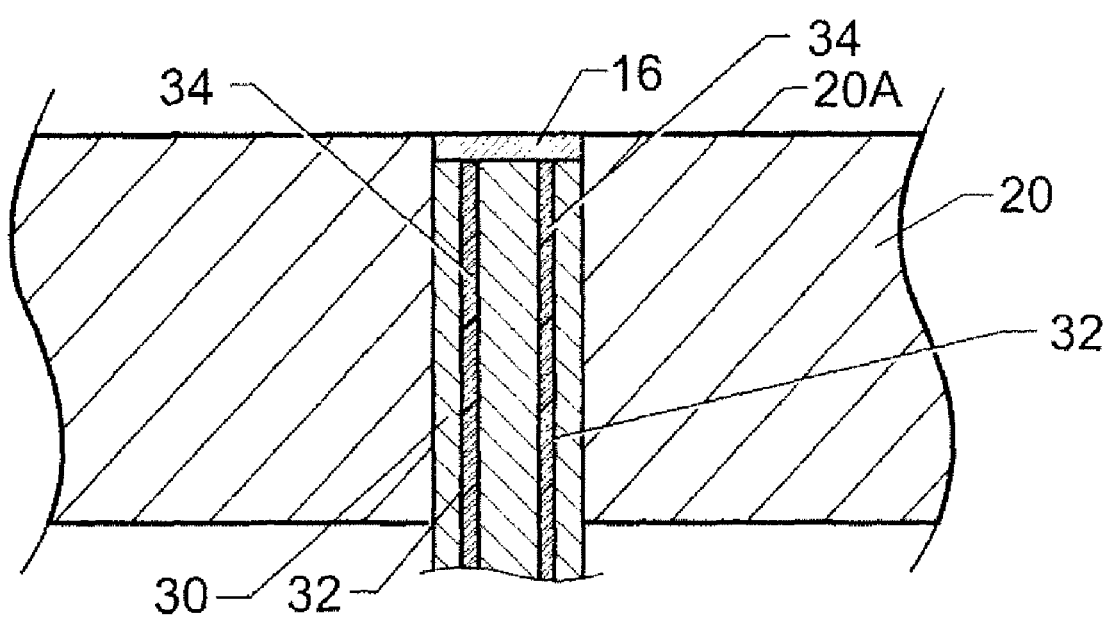
FIG. 6 is a cross-sectional view of a wave transmission apparatus installed in a wall structure in accordance with still another embodiment of the present invention.

In still another possible embodiment of the present invention, refractory oxide housing 30 with optical fiber(s) 34 housed therein is installed directly in a wall structure 20 as illustrated in FIG. 6. Here, window 16 is bonded to one end of housing 30 that is located at or near surface 20A. The combination of window 16/housing 30/fibers 34 provides the same functions as window 16/conduit 12 as explained earlier herein.

Figure 7:
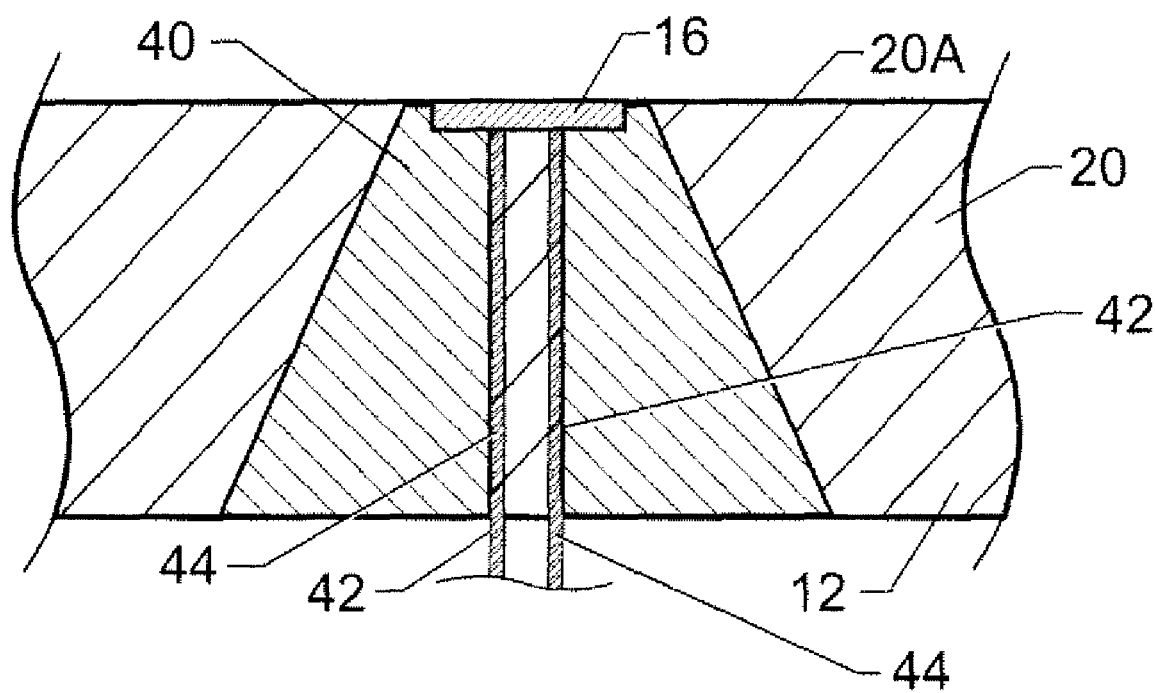
FIG. 7 is a cross-sectional view of a wave transmission apparatus installed in a wall structure in accordance with another embodiment of the present invention.

In yet another embodiment of the present invention, the elongate refractory oxide housing could be a one-piece conical structure as shown in FIG. 7 where solid-wall housing 40 has axially-oriented through holes 42, each of which encases one or more optical fibers 44. Window 16 can be coupled to one end of housing 40 as described above. As in other embodiments, the exterior surface of solid-wall housing 40 can be conical (as shown) or other simple or complex geometric shapes without departing from the scope of the present invention.

The advantages of the present invention are numerous. The wave energy transmission apparatus will transmit wave energy from a high-temperature environment to a lower-temperature environment. The present invention provides a simple solution to the problem of collecting optical wave energy data from a space vehicle's re-entry shockwave. However, the present invention can also be used in scramjet combustors or lab applications where wave energy from a high temperature environment must be transmitted to measurement sensors maintained in a lower temperature environment. Thus, the present invention can be used in a wide range of temperatures, advantageously including very high temperature environments, such as those exceeding 3500° F.

The exact dimensions, including the apparatus's overall size, and wall and window widths (thickness), will vary in accordance with the particular application, as would be known to one skilled in the art (e.g., depending on pressure, temperature, support structure size, sensor size, etc.). However, in one exemplary, non-limiting embodiment, for example when used in a heat shield during re-entry, in accordance with the embodiment shown in FIG. 1, the height (or length) of the apparatus might be between about 3" and 4", the width (thickness) of the walls 14 might be about 1/16" to 1/8", the length or diameter of the window 16 may be between about 1/4' to 3/4", and the window width (thickness), might be between about 1/8" to 1/4".

Additional discussion of the present invention, including materials and apparatus that might be used in or with the current invention, can be found in the following article which is hereby incorporated by reference in its entirety: Buckley, John D., Carlberg, Ingrid A., Kelliher, Warren C., Edwards, William C., Schott, Timothy D. "Innovative Structural Design and Materials for Transmission to and Protection of UV and IR Sensors during Atmospheric Re-Entry or in Other High-Temperature Environments (>3500° F.)," Proceedings of the 32$^{nd}$ Annual (ITAR) Conference on Composites, Materials & Structures, Jan. 28-31, 2008, in Daytona Beach, Fla., sponsored by the U.S. Advanced Ceramics Association, compact disc, Jul. 2008.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A wave energy transmission apparatus for transmitting optical wave energy from a high-temperature environment to a thermally-protected environment, comprising:
   a conic, open-ended tube made from at least one refractory oxide, said tube adapted to be installed in a thermally-protective structure such that said tube extends therethrough, said tube having a tapered end positioned proximate to a sidewall of the structure that will be exposed to a high-temperature environment; and a transparent window made from an amorphous ceramic selected from the group consisting of yttria and zirconia, said window being bonded into said tube at and flush with said tapered end thereof.

2. A wave energy transmission apparatus as in claim 1, wherein the sidewall is a heat shield, and wherein said tapered end protrudes from, or is flush with, an outer surface of the heat shield.

3. A wave energy transmission apparatus as in claim 1, wherein said at least one refractory oxide is selected from the group consisting of hafnia, yttria, and zirconia.

4. A wave energy transmission apparatus as in claim 1, further comprising at least one optical fiber disposed in said tube and extending therethrough.

5. A wave energy transmission apparatus as in claim 1, wherein an exterior surface of said tube defines at least one stepped region adapted to be captured within the structure.

6. A wave energy transmission apparatus, comprising:

a thermal protection structure having a first side exposed to a high-temperature environment and a second side that is thermally protected from the high-temperature environment;

a substantially conically-shaped conduit defined by solid walls made from refractory oxide, said conduit having a first open end and a second open end with a diameter of said first open end being less than a diameter of said second open end, said solid walls further defining an exterior region engaged within said thermal protection structure, said conduit extending from said first side of said structure to said second side of said structure; and a transparent window fitted into said conduit at and flush with said first open end thereof wherein wave energy entering said first open end passes through said window, said window being made from an amorphous ceramic selected from the group consisting of yttria and zirconia.

7. A wave energy transmission apparatus as in claim 6, wherein said refractory oxide is selected from the group consisting of hafnia, yttria, zirconia, and mixtures thereof.

8. A wave energy transmission apparatus as in claim 6, wherein said first open end of said conduit protrudes from, said first side of said structure.

9. A wave energy transmission apparatus as in claim 6, wherein said exterior region defines at least one step captured within said thermal protection structure.

10. A wave energy transmission apparatus as in claim 6, further comprising at least one optical fiber disposed in said conduit and extending between said first open end and said second open end.

11. A wave energy transmission apparatus for transmitting optical wave energy from a high-temperature environment experienced by a space vehicle during atmospheric re-entry to a thermally-protected environment within the space vehicle, comprising:

a thermally-protective structure that includes an ablative heat shield adapted to be exposed to the high-temperature environment experienced during atmospheric re-entry;

an open-ended, concially-shaped tube made from at least one refractory oxide and installed in said thermally-protective structure such that said tube extends therethrough, said tube having an end positioned proximate to said ablative heat shield; and a transparent window made from an amorphous ceramic selected from the group consisting of yttria and zirconia, said window being bonded into said tube at and flush with said end proximate to said ablative heat shield.

12. A wave energy transmission apparatus as in claim 11, wherein said end of said tube and said window protrude from, ablative heat shield.

13. A wave energy transmission apparatus as in claim 11, wherein said at least one refractory oxide is selected from the group consisting of hafnia, yttria, and zirconia.

14. A wave energy transmission apparatus as in claim 11, further comprising at least one optical fiber disposed in said tube and extending therethrough.

15. A wave energy transmission apparatus as in claim 11, wherein an exterior surface of said tube defines at least one step captured within said thermally protective structure.

* * * * *